(12) United States Patent
Chen et al.

(10) Patent No.: US 8,982,331 B2
(45) Date of Patent: Mar. 17, 2015

(54) LASER RANGEFINDER AND CONDENSER LENS THEREOF FOR RECEIVING A LIGHT RAY

(71) Applicant: Chervon (HK) Limited, Wanchai (HK)

(72) Inventors: Ming Chen, Nanjing (CN); Wu Chen, Nanjing (CN)

(73) Assignee: Chevron (HK) Limited, Hong Kong (HK)

( * ) Notice: Subject to any disclaimer, the term of this patent is extended or adjusted under 35 U.S.C. 154(b) by 146 days.

(21) Appl. No.: 13/866,375

(22) Filed: Apr. 19, 2013

(65) Prior Publication Data

US 2013/0278916 A1   Oct. 24, 2013

(30) Foreign Application Priority Data

Apr. 23, 2012   (CN) .......................... 2012 1 0118988

(51) Int. Cl.
*G02B 19/00* (2006.01)
*G01S 7/481* (2006.01)
*G01B 11/02* (2006.01)

(52) U.S. Cl.
CPC ............. *G02B 19/0009* (2013.01); *G01S 7/481* (2013.01); *G01B 11/026* (2013.01); *G02B 19/0085* (2013.01); *G01S 7/4816* (2013.01)

USPC ................................................ 356/3; 356/123

(58) Field of Classification Search
USPC .......... 356/3, 3.01, 4.03, 4.05, 123, 124, 125, 356/127; 250/201.1, 201.2, 201.7, 201.8; 396/114, 121; 348/352, 349, 240.1; 359/719, 642, 724

See application file for complete search history.

(56) References Cited

U.S. PATENT DOCUMENTS

| | | | | | |
|---|---|---|---|---|---|
| 4,511,232 | A | * | 4/1985 | Yamada ........................... | 396/93 |
| 4,513,378 | A | * | 4/1985 | Antkowiak .................... | 701/494 |
| 5,266,791 | A | * | 11/1993 | Morizumi .................. | 250/201.3 |
| 5,422,699 | A | * | 6/1995 | Sato et al. ....................... | 396/82 |
| 5,923,909 | A | * | 7/1999 | Hamada ........................ | 396/114 |
| 6,322,192 | B1 | * | 11/2001 | Walker ............................ | 347/19 |
| 2010/0110548 | A1 | * | 5/2010 | Korenaga et al. ............. | 359/571 |
| 2011/0298888 | A1 | * | 12/2011 | Shimada ......................... | 348/37 |
| 2012/0050577 | A1 | * | 3/2012 | Hongu ........................ | 348/240.1 |
| 2012/0182462 | A1 | * | 7/2012 | Hamada ....................... | 348/352 |

\* cited by examiner

*Primary Examiner* — Sang Nguyen
(74) *Attorney, Agent, or Firm* — Greenberg Traurig, LLP

(57) ABSTRACT

A condenser lens suitable for a laser rangefinder includes a lens body wherein the lens body is formed with or has attached thereto a deviation correction area that is located on the light emitting side thereof for correcting focus deviation upon reception of light scattered by a close range object. A center of the body is located inside the deviation correction area of the lens. The deviation correction area may include one or more deviation correction zones.

20 Claims, 4 Drawing Sheets

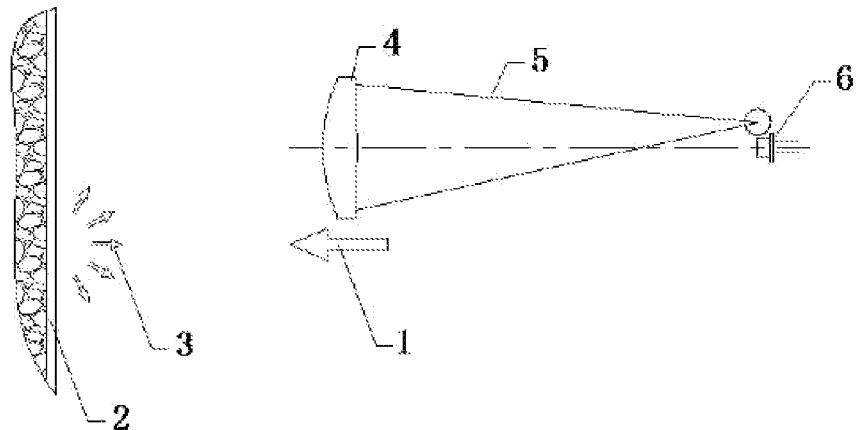
FIG.1 - PRIOR ART
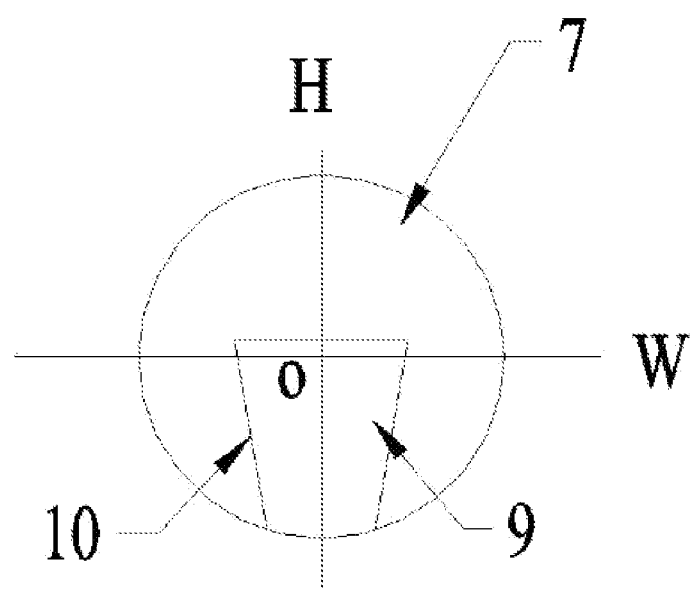
FIG.2

LASER RANGEFINDER AND CONDENSER LENS THEREOF FOR RECEIVING A LIGHT RAY

RELATED APPLICATION INFORMATION

The subject application claims the benefit of CN 201210118988.2, filed on Apr. 23, 2012, the disclosure of which is incorporated herein by reference in its entirety.

BACKGROUND

The following generally relates to the field of optics and, more particularly, to a laser rangefinder and a condenser lens thereof for receiving a light ray.

An optics system of a laser rangefinder includes a laser emitting system and an optical signal receiving system, wherein the optical axes of the laser emitting system and the optical signal receiving system are arranged in parallel with each other and a sensing face of a detecting element 6 is located on the focus of the receiving system as shown in FIG. 1. The laser emitting system collimates laser into a laser beam 1 to illuminate an object surface 2 at an ultra-short distance, and scattered light 3 is converged by a condenser lens 4 into a large spot with the center thereof often deviating far from the focus of the condenser lens 4, so no signal light can enter the detecting element 6. Consequently the existing condenser lens 4 usually fails to receive a light ray well, thus preventing a stable light ray input to the detecting element 6 from being developed and thus hindering the range finding capability of the system.

SUMMARY

In order to solve this and other drawbacks of the prior art, the following generally describes an a condenser lens suitable for a laser rangefinder for receiving a light ray wherein the condenser lens is capable of effectively receiving scattered light arising from exiting laser incident upon an object at a short distance and converging the scattered light to a detecting element.

More particularly, the condenser lens includes a lens body, wherein the lens body is formed or attached with a lens deviation correction area that is located on the light emitting side thereof for correcting focus deviation upon reception of light scattered by an object at a short distance, and the lens center of the lens body is located inside the deviation correction area. The deviation correction area includes at least one deviation correction zone for correcting focus deviation in correspondence to close range objects at different distances.

The invention also provides a laser rangefinder, including an emitting lens and a condenser lens. The optical axis of the emitting lens of laser rangefinder may be parallel to but not coincident with that of the lens body wherein the direction of the optical axis passing the focus of the emitting lens and perpendicular to the optical axis of the lens body is a height direction and wherein the direction of the optical axis perpendicular to both the height direction and the direction in which laser exits is a width direction. The deviation correction area of lens may thus be arranged at the side of the lens body proximate to the emitting lens and having a size in the height direction smaller than that of the lens body in the height direction.

As will be appreciated, the above embodiments have the advantage of providing a condenser lens suitable for a laser rangefinder for receiving a light ray where the condenser lens effectively receives scattered light arising from an exiting laser incident upon a close range object and converges the scattered light to a detecting element.

BRIEF DESCRIPTION OF THE DRAWINGS

FIG. 1 is a schematic principle diagram of an optics system of an existing laser rangefinder;

FIG. 2 is a schematic structural diagram of an exemplary condenser lens constructed according to the description which follows;

DETAILED DESCRIPTION

Referring to FIGS. 2-7, a condenser lens according to the description which follows, suitable for use with a laser rangefinder and adapted to receive a light ray, generally includes a lens body 7 which can be a generally convex lens and preferably a lens with one face being convex and the other face being flat, where the convex face is non-spherical, i.e., a non-spherical lens. Moreover the lens body 7 can have a rounded contour or have a part of the rounded count our cut out so that there is a segment of a straight line at the edge of the contour as illustrated in FIGS. 3-7.

Figure 8:
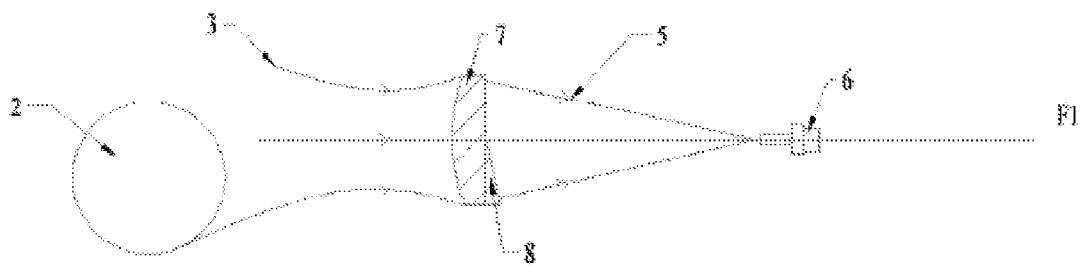
FIG. 8 is a schematic principle diagram illustrating deviation correction according to the description which follows.

The lens body 7 is formed therewith a deviation correction area or has the deviation correction area attached thereto. The deviation correction area is located on the light emitting side of the lens body 7 to correct for focus deviation upon reception of a laser beam scattered by a close range object. The lens center O of the lens body 7 is located inside the deviation correction area of the lens body 7 and includes at least one deviation correction zone 8 for correcting for focus deviation in correspondence to close range objects at different distances. Preferably the deviation correction zone 8 can be formed of a slot or a protrusion with which the lens body 7 is provided at the emitting side of the lens body 7. Referring to FIG. 8, for the purpose of deviation correction, the slot or the protrusion of which the deviation correction zone 8 is formed is preferably formed with an inclined plane at a non-right angle relative to the optical axis F1 of the lens body, and in order for a light ray to be converged instead of being diverged, the plane is preferably inclined to converge the light ray toward a detecting element 6 as illustrated in the inclined plane of the deviation correction zone 8 in FIG. 8.

Figure 6:
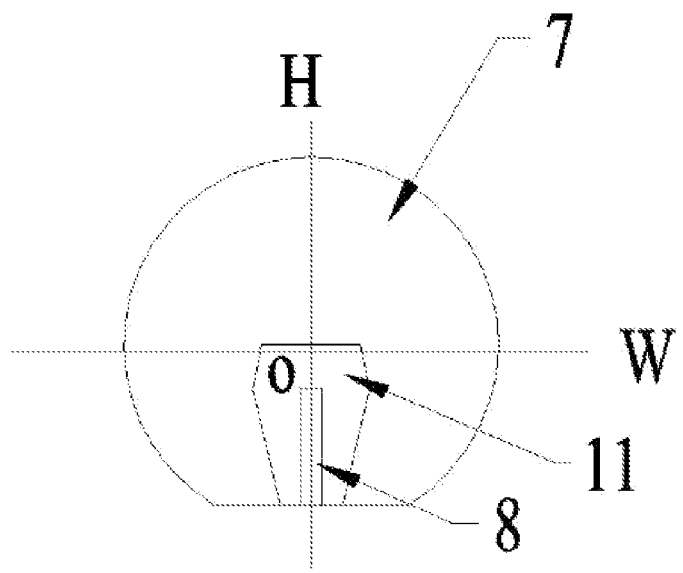
FIG. 6 is a schematic structural diagram of a further exemplary condenser lens constructed according to the description which follows.
Figure 7:
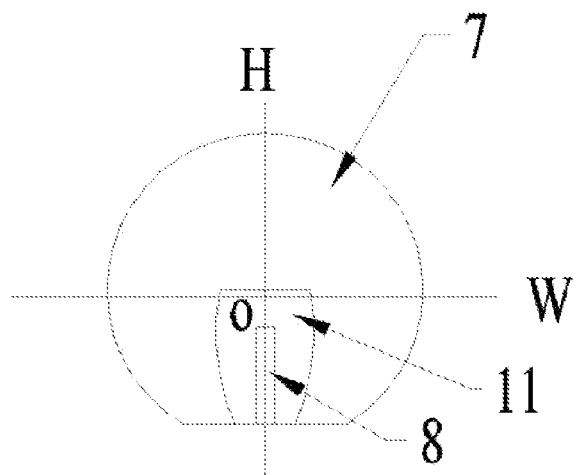
FIG. 7 is a schematic structural diagram of a further exemplary condenser lens constructed according to the description which follows.

Since it is necessary for the laser rangefinder to measure objects 2 at respective distances, the deviation correction area of the lens includes at least one deviation correction zone 8 as illustrated in FIG. 6 and FIG. 7.

Referring to FIGS. 2-5, when there is only one deviation correction zone 8, the deviation correction zone 8 is the entire deviation correction area of lens; and when the number of deviation correction zones 8 is larger than one, that is, there are a plurality of deviation correction zones 8 in the deviation correction area of lens, the different deviation correction zones 8 have their inclined planes for deviation correction formed at different angles relative to the optical axis F1 of the lens body for the purpose of corresponding deviation correction at different measurement distances. In terms of their sizes and shapes on the lens body 7, the deviation correction zones 8 constitute a nested system in an order of descending sizes so that a smaller deviation correction zone is nested in a larger deviation correction zone. It shall be noted that the lens center O of the lens body 7 is located inside, or coincides with the edge of, the largest deviation correction zone among the deviation correction area of lens. The lens center O as referred to herein refers to the point corresponding to the focus of the lens body 7 projected onto the lens body 7 with the optical axis F1 of the lens body being a projection line. This has an advantage of ensuring the continuity of measured data because it has been seen that, if the lens center O is located outside of the deviation correction area of lens, then the measured data may fluctuate significantly around this special location of the lens center O without deviation correction for the part of the light ray between the edge of the deviation correction area of lens and the lens center O.

Preferably the deviation correction area of lens has the edge thereof coinciding with the edge of the lens body 7, and referring to the embodiment as illustrated in FIG. 2, since the deviation correction zone 8 is the entire deviation correction area of lens, the edge of the deviation correction zone 8 is the edge of the entire deviation correction area of the lens as illustrated in FIG. 2, and as can be apparent, the edge of the deviation correction zone 8 in the lower part of the figure coincides with the edge of the entire lens body 7, that is, the edge of the lens body 7 is also the edge of the deviation correction area of the lens, where the deviation correction area of the lens has the edge thereof starting with the edge of the lens body 7 for the advantage of enabling the deviation correction area of the lens to cover the zone of the lens body 7 in which the light ray is preferably refracted. When the deviation correction area of the lens includes a plurality of deviation correction zones 8 in the embodiments as illustrated in FIGS. 2-5, the edge of the largest deviation correction zone coincides with the edge of the lens body 7 or all the deviation correction zones coincide with the edge of the lens body 7, that is, a larger deviation correction zone completely surrounds a smaller one, or a larger deviation correction zone partially surrounds a smaller one with their edges coinciding.

In terms of the shape of the deviation correction zone 8, a rectangle or another common shape can serve as a general option for the deviation correction zone and the rectangle will have one side thereof changed to an arc when the deviation correction zone 8 coincides with the edge of the lens body 7.

If the deviation correction zone 8 is shaped as a rectangle or the like, then the length and the width thereof will be unchanged, and since the optical axis of the laser emitting lens is located outside of the lens body 7 instead of coinciding with the optical axis F1 of the lens body, this will have the measured data that may fluctuate significantly, thus degrading the precision, and thus it is desirable to design the shape of the deviation correction zone 8 so that a further optical axis of the lens away from exiting laser is wider, and since the optical axis is located outside of the lens body 7, the optical axis further away from the edge of the lens body 7 is narrower.

It shall be noted that the height direction H as referred to herein refers to the direction of exiting the focus of a lens 13 and perpendicular to the optical axis F1 of the lens body, and the width direction W as referred to herein refers to the direction perpendicular to both the height direction H and the direction in which laser exits, that is, the height direction H depends upon the location of the emitting lens 13. For a convenient description, the vertical direction in FIGS. 2-7 and FIG. 9 represents the height direction H, and the horizontal direction therein represents the width direction W.

Figure 9:
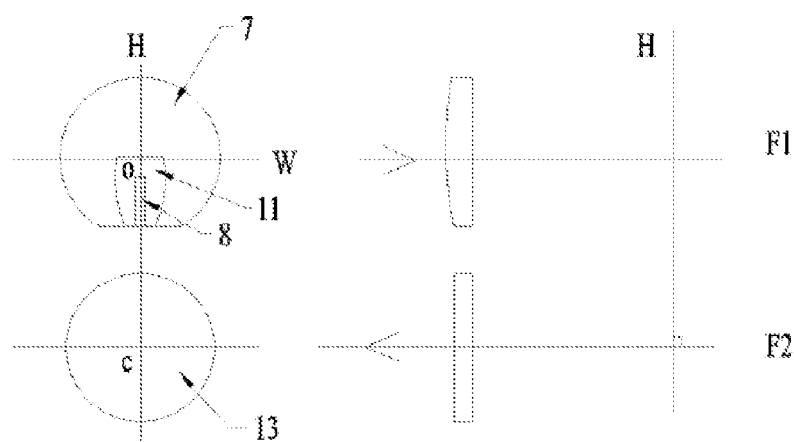
FIG. 9 is a schematic structural diagram of an exemplary optics system of a laser rangefinder according to the description which follows.

Referring to FIG. 1, FIG. 8 and FIG. 9, for practical measurement, since scattered light 3 far away from the optical axis of the lens 13 will be attenuated; it is desirable for the deviation correction zone 8 to increase in width for compensation.

Referring to FIG. 2 to FIG. 7, the deviation correction area of lens includes at least one compensating deviation correction zone for compensating for measurement over-fluctuation due to the different optical axis F2 of the laser emitting lens of the laser rangefinder being non-coaxially aligned with the optical axis F1 of the lens body.

Referring to FIG. 2, preferably the compensating deviation correction zone includes a first-class deviation correction zone 9 increasing in width from the edge of the lens body 7 toward the lens center O. Two contour lines delimiting the width of the first-class deviation correction zone 9 are referred to as first-class side lines 10.

The width as mentioned below refers to the size of the deviation correction zone in the width direction W.

As illustrated in FIG. 2, the first-class deviation correction zone 9 can be shaped like a trapezoid.

Referring to FIGS. 3-6, preferably the compensating deviation correction zone includes a second-class deviation correction zone 11 firstly increasingly and then decreasing in width from the edge of the lens body 7 toward the lens center O. The second-class deviation correction zone 11 has its contour lines including two second-class side lines 12 delimiting the width thereof.

As a laser beam has the characteristic of a Gaussian beam which upon propagation thereof in space has a section area larger at both ends and smaller in the middle and is subjected to propagation at an edge in compliance with a Gaussian function the use of the foregoing first-class deviation correction zone 9 can fail to work well with compensation to provide the measured data with good stability in some circumstances. In view of this, the second-class deviation correction zone 11 has been devised so that the width thereof firstly increases and then decreases to better accommodate the Gaussian-beam characteristic of the laser beam to thereby improve the stability of the measured data in such circumstances.

Figure 3:
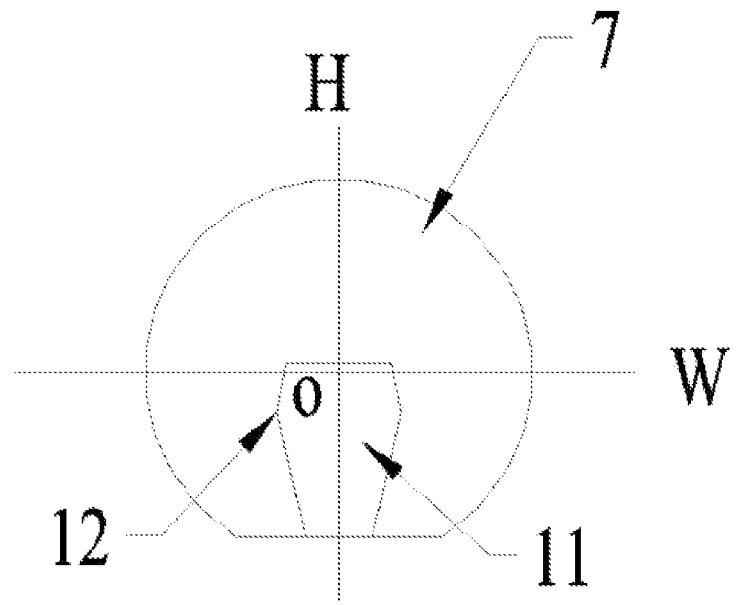
FIG. 3 is a schematic structural diagram of a further exemplary condenser lens constructed according to the description which follows.
Figure 4:
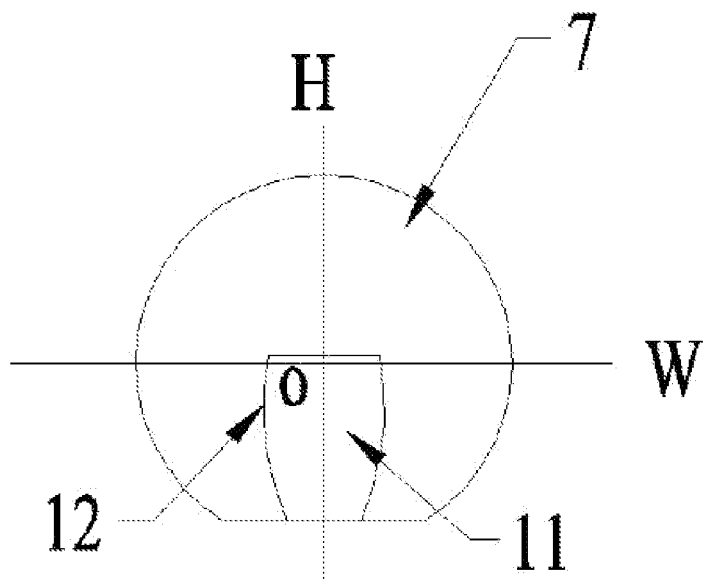
FIG. 4 is a schematic structural diagram of a further exemplary condenser lens constructed according to the description which follows.
Figure 5:
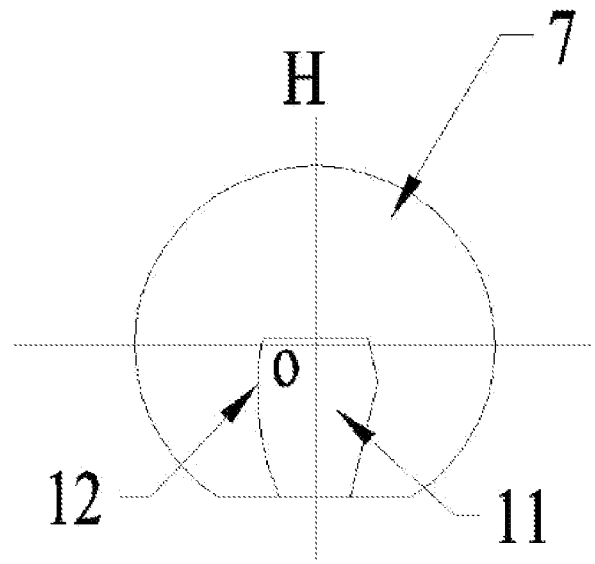
FIG. 5 is a schematic structural diagram of a further exemplary condenser lens constructed according to the description which follows.

Referring to FIGS. 3 and 4, preferably the second-class deviation correction zone 11 is a symmetrically-mirrored shape, that is, the two second-class side lines 12 can be symmetrically mirrored. Preferably, the second-class side lines 12 can be segments of a curved line, particularly segments of a Gaussian-function curved line, or two intersecting segments of a straight line. In the latter case, as illustrated in FIG. 3, each of the two segments of straight lines intersect at one end thereof, and the two segments of straight lines have a non-right angle therebetween. In other words, the second-class side line 12 is divided into two parts of two segments of straight lines intersecting at their ends with the smaller one of their angles being an acute angle.

The second-class deviation correction zone 11 may not necessarily be symmetrically mirrored in order to provide compensation, but alternatively respective ones of the two second-class side lines 12 can be a segment of curved line and two straight lines or the two second-class side lines 12 can be a combination of a segment of curved line and a straight line as long as the second-class deviation correction zone 11 firstly increases and then decreases in width.

It shall be noted that the width of the-class deviation correction zone 11 proximate to the lens center O shall be larger than the width thereof proximity the edge despite such a width firstly increasing and then decreasing from the edge toward the lens center O.

Referring to FIGS. 6 and 7, in these two embodiments, two deviation correction zones 8 are set for different distances so that the larger one is a compensating deviation correction zone with the other deviation correction zone located inside thereof, and since the smaller deviation correction zone compensates for the object 2 at a very short distance, the effect of the Gaussian-beam characteristic may not be very obvious, and this deviation correction zone 8 may not be implemented as a compensating deviation correction zone in view of the size and manufacturing thereof, and the compensating deviation correction zone can be either the first-class deviation correction zone 9 or the second-class deviation correction zone 11, the latter of which is adopted in both FIG. 6 and FIG. 7 for better stability.

In addition to the requisite components of a general laser rangefinder, all of which will be known to those skilled in the art and a repeated description of which therefore be omitted here from, a laser rangefinder includes the emitting lens 13 and the inventive condenser lens 4, where the focal axis of the emitting lens 13 is parallel to but does not coincides with the optical axis F1 of the lens body, the direction passing the focus of the emitting lens and perpendicular to the optical axis F1 of the lens body is the height direction H, the direction perpendicular to both the height direction H and the direction in which laser exits is the width direction W, and the deviation correction area of lens is arranged at the side of the lens body 7 proximate to the emitting lens 13 and has a smaller size in the height direction H than the size of the lens body 7 in the height direction H.

The foregoing embodiments shall not be considered as limiting the scope of the following claims. Rather all technical solutions achieved as a result of equivalent substitutions or modifications shall come into the scope of the following claims.

LIST OF REFERENCE NUMBERS

1. Laser beam, 2. Object, 3. Scattered light, 4. Condenser lens, 5. Converged light, 6. Detecting element, 7. Lens Body, 8. Deviation correction zone, 9. First-class-correction zone, 10. First-class side line, 11. Second-class correction zone, 12. Second-class side line, 13. Emitting lens, c. Projection point corresponding to optical axis of lens, O. Lens center, H. Height direction, W. width direction, F1. Optical axis of lens body, and F2. Optical axis of emitting lens.

What is claimed is:

1. A condenser lens suitable for a laser rangefinder for receiving a light ray produced thereby, the condenser lens comprising a lens body, wherein the lens body is provided with a deviation correction area located on a light emitting side thereof for correcting focus deviation upon reception of the light ray scattered by an object at a short distance, and a lens center of the lens body is located inside the deviation correction area of the lens, the deviation correction area comprising at least one deviation correction zone for correcting focus deviation in correspondence to close range objects located at different distances relative to the laser range finder.

2. The condenser lens suitable for a laser rangefinder for receiving a light ray according to claim 1, wherein the at least one deviation correction zone comprises a plurality of deviation correction zones arranged as a nested system in an order of descending sizes so that a smaller deviation correction zone is nested in a larger deviation correction zone.

3. The condenser lens suitable for a laser rangefinder for receiving a light ray according to claim 2, wherein the lens center is located inside the largest deviation correction zone of the deviation correction area of lens.

4. The condenser lens suitable for a laser rangefinder for receiving a light ray according to claim 1, wherein the deviation correction area comprises an edge coinciding with an edge of the lens body.

5. The condenser lens suitable for a laser rangefinder for receiving a light ray according to claim 1, wherein the deviation correction zone is a slotted region formed in the lens body.

6. The condenser lens suitable for a laser rangefinder for receiving a light ray according to claim 1, wherein the deviation correction zone is a protrusion region formed on the lens body.

7. The condenser lens suitable for a laser rangefinder for receiving a light ray according to claim 1, wherein the lens body has one face being convex and another face being flat, and the deviation correction area is arranged on the flat face of the lens body.

8. The condenser lens suitable for a laser rangefinder for receiving a light ray according to claim 1, wherein the lens body is a non-spherical lens.

9. The condenser lens suitable for a laser rangefinder for receiving a light ray according to claim 1, wherein an edge of the lens body is formed with a segment of a straight line.

10. The condenser lens suitable for a laser rangefinder for receiving a light ray according to claim 1, wherein the deviation correction area comprises at least one compensating deviation correction zone for compensating for measurement over-fluctuation due to the optical axis of a laser emitting lens of the laser rangefinder being non-coaxially aligned with the optical axis of the lens body, and the compensating deviation correction zone comprises a first-class deviation correction zone increasing in width from an edge of the lens body toward a center of the lens.

11. The condenser lens suitable for a laser rangefinder for receiving a light ray according to claim 10, wherein contour lines of the first-class deviation correction zone comprise two first-class side lines delimiting the width thereof and the first-class side lines are segments of a straight line.

12. The condenser lens suitable for a laser rangefinder for receiving a light ray according to claim 10, wherein the compensating deviation correction zone comprises a second-class deviation correction zone firstly increasing and then decreasing in width from an edge of the lens body toward a center of the lens.

13. The condenser lens suitable for a laser rangefinder for receiving a light ray according to claim 12, wherein the contour lines of the second-class deviation correction zone comprise two second-class side lines delimiting the width thereof, one of the second-class side lines is a segment of a curved line, and another one of the second-class side lines is a segment of a straight line.

14. The condenser lens suitable for a laser rangefinder for receiving a light ray according to claim 13, wherein the second-class side line which is a segment of a curved line is a segment of a Gaussian-function curved line.

15. The condenser lens suitable for a laser rangefinder for receiving a light ray according to claim 13, wherein another of the second-class side lines is divided into two segments of a straight line intersecting at their ends with the smaller one of their angles being an acute angle.

16. The condenser lens suitable for a laser rangefinder for receiving a light ray according to claim 13, wherein the second-class side lines are symmetrically mirrored.

17. The condenser lens suitable for a laser rangefinder for receiving a light ray according to claim 13, wherein one of the second-class side lines is divided into two segments of straight lines intersecting at their ends with the smaller one of their angles being an acute angle, and another one of the second-class side lines is a segment of a straight line.

18. The condenser lens suitable for a laser rangefinder for receiving a light ray according to claim 17, wherein the second-class side lines are symmetrically mirrored.

19. The condenser lens suitable for a laser rangefinder for receiving a light ray according to claim 10, wherein a width of the compensating deviation correction zone proximate to a center of the lens is larger than that proximate to an edge of the lens.

20. A laser rangefinder, comprising an emitting lens and a condenser lens in which an optical axis of the emitting lens is parallel to but not coincident with the optical axis of the condenser lens, and a direction passing a focus of the emitting lens and perpendicular to the optical axis of the condenser lens is a height direction, while a direction perpendicular to both the height direction and a direction in which a laser exits the emitting lens is a width direction, and a deviation correction area of the condenser lens is arranged at a side of the condenser lens proximate to the emitting lens and has a size in the height direction smaller than that of the condense lens in the height direction.

* * * * *